United States Patent [19]
Chisholm et al.

[11] Patent Number: 5,968,143
[45] Date of Patent: Oct. 19, 1999

[54] INFORMATION HANDLING SYSTEM FOR TRANSFER OF COMMAND BLOCKS TO A LOCAL PROCESSING SIDE WITHOUT LOCAL PROCESSOR INTERVENTION

[75] Inventors: Douglas Roderick Chisholm, Delray Beach; Gary Hoch, Coral Springs, both of Fla.; Timothy Vincent Lee, Raleigh; Andrew Boyce McNeill, Jr., Apex, both of N.C.; Ed Wachtel, New York, N.Y.

[73] Assignee: International Business Machines Corporation, Armonk, N.Y.

[21] Appl. No.: 08/572,235
[22] Filed: Dec. 13, 1995
[51] Int. Cl.$^6$ ...................................................... G06F 13/12
[52] U.S. Cl. .................................. 710/23; 710/24; 710/25; 710/26
[58] Field of Search ..................................... 395/821, 824, 395/842, 843, 844, 845, 846, 847, 848, 309, 310

[56] References Cited

U.S. PATENT DOCUMENTS

| | | | |
|---|---|---|---|
| 5,251,303 | 10/1993 | Fogg, Jr. et al. | 395/844 |
| 5,274,795 | 12/1993 | Vachon | 395/500 |
| 5,367,639 | 11/1994 | Sodos | 395/844 |
| 5,469,548 | 11/1995 | Callison et al. | 395/441 |
| 5,475,860 | 12/1995 | Ellison et al. | 395/846 |
| 5,619,728 | 4/1997 | Jones et al. | 395/847 |
| 5,625,842 | 4/1997 | Dalrymple | 395/842 |

*Primary Examiner*—Eddie P. Chan
*Assistant Examiner*—Hiep T. Nguyen
*Attorney, Agent, or Firm*—Bernard D. Bogdon

[57] ABSTRACT

An information handling system transfers command blocks between a host processing side having a host processing unit and a host memory and a local processing side having a local processing unit and a local memory. The command blocks are transferred from the host processing side to the local processing side by storing the host address of the command block in a local side register set. Upon storing the host address a transfer signal is given to a command block transfer controller to start a command block transfer without the local processor unit intervention.

12 Claims, 5 Drawing Sheets

INFORMATION HANDLING SYSTEM FOR TRANSFER OF COMMAND BLOCKS TO A LOCAL PROCESSING SIDE WITHOUT LOCAL PROCESSOR INTERVENTION

RELATED ART

Patent document Ser. No. 08/572,234 filed Dec. 13, 1995, entitled AN INFORMATION HANDLING SYSTEM HAVING A LOCAL ADDRESS QUEUE FOR LOCAL STORAGE OF COMMAND BLOCKS TRANSFERRED FROM A HOST PROCESS SIDE.

TECHNICAL FIELD

This invention relates to the field of computer systems and more particularly to transfer of command blocks between two processing units communicating over an expansion bus.

BACKGROUND

With the widespread acceptance of personal computers in today's society, there is a constant need to reliably and expediently transfer large blocks of data among various component of the system. Networked personal computers (PC) have a constant need to receive and transmit large blocks of data among each other. Furthermore, the need for transferring large blocks of data is specially important in the increasingly popular client/server information handling environments. In such environments, a plurality of client work stations are networked and coupled to one or more server system, thus, allowing the client stations to share system resources, such as, files, printers, and applications. As a result, server systems are often required to transfer very large blocks of data from storage devices to client stations. In order to insure data integrity, it is customary to generate a status signal upon completion of data block transfers indicating transfer error conditions, if any.

Generally, data transfer form one system to another is handled through a local interface controller which is coupled to a host system unit via an Input/output (I/O) expansion bus. The interface controller may be a storage device interface, such as a Small Computer System Interface (SCSI) controller, or a communication interface such as an Ethernet or Token Ring Local Area Network Controller (LAN). Some I/O expansion bus protocols allow an interface controller to take control of the bus and transfer data to and from the host unit. Such interface controllers are known as bus masters and operate with I/O buses supporting bus mastering protocols. Two exemplary I/O expansion buses supporting bus mastering protocols are Peripheral Component Interconnect (PCI) bus and MicroChannel I/O bus.

Over the years various techniques have been devised for transferring data to and from a memory device efficiently. Direct memory access (DMA) technique has been widely used to transfer large blocks of consecutive data from a direct access storage device (DASD) to and from system memory. In a computer system with DMA capability, CPU is relieved of the overhead involved in transferring large amounts of data by transmitting only a starting address, and block count to a DMA controller. The system CPU simply programs the DMA controller with the starting address and the byte count to perform the specified DMA transfer. The DMA controller, which may be implemented as a state machine, receives and stores within its internal registers the starting address information and the block count transmitted by the CPU. Thereafter, depending on data direction signaled by the CPU, the DMA controller sequentially transfers the data between the system memory and a local interface controller over the I/O expansion bus. Upon completion of each data transfer, the DMA controller generates a signal informing the CPU of completion of the data transfer as well as a status signal indicating whether any transfer error conditions occurred during the DMA transfer. Depending on a transfer error condition and controlling software, the CPU may retry the DMA cycle.

Therefore, some systems utilize a command transfer queuing technique to queue data transfer status information of data blocks thus allowing a CPU to appropriately time servicing data block transfers. One such method titled "SYSTEM FOR ASYNCHRONOUSLY DELIVERING SELF-DESCRIBING CONTROL ELEMENTS WITH A PIPE INTERFACE HAVING DISTRIBUTED SHARED MEMORY" is disclosed in the U.S. Pat. No. 5,325,492, issued on Jun. 28, 1994 and assigned to the assignee of the present invention.

However, with the advent of local interface controllers capable of performing local mastering there is also a need to reduce command block transfer overhead on the local processing side in order to increase data transfer throughput between host and local processing sides.

Typically a local interface controller has a series of registers which when loaded interrupt the local processing unit signaling pendency of a command. The command can be located within the registers, where it can be directly DMAed into the local memory by the local processing unit from the system memory. Alternatively, a host processing unit can create the command blocks and place them in a queue. Upon completion, the host processing unit can interrupt the local processing unit that one or more commands have been place in the queue. Upon receipt of such interrupt, the local processing unit is prompted to service that interrupt and process the command block.

Conventional, methods of transferring command blocks however require the host processing unit and the local processing unit to interact with each other. In addition to interrupting the local processor, such interaction requires existence of some type of synchronous or asynchronous communication, e.g. hand shaking, between the host processing unit and the local processing unit which may significantly increase overhead associated with transferring command blocks to the local processing side.

Furthermore, when interrupting the local processing unit, it is required to assign the highest priority to such interrupt to prevent wasting valuable host processing unit cycles.

Therefore, there is a need for a more efficient transfer of command blocks from the host processing side to the local processing side.

SUMMARY OF THE INVENTION

According to the present invention, an information handling system capable of handling command block transfers between a host processing side and a local processing side. In the host processing side, the information handling system includes a host processing unit and a host memory accessible by the host processing unit. In the local side, the information handling system includes a local processing unit and a local memory accessible by the local processing unit. A command block transfer controller, includes a command address register set accessible by the host processing unit for writing a host memory address information corresponding to a host memory portion storing a command block to be transferred and concurrent therewith for writing a transfer start signal. The command block transfer controller is responsive to the transfer start signal written by the host processing unit to start a command transfer for retrieving a command block from a corresponding host memory portion without local processing unit intervention.

DETAILED DESCRIPTION OF THE PREFERRED EMBODIMENT

Figure 1:
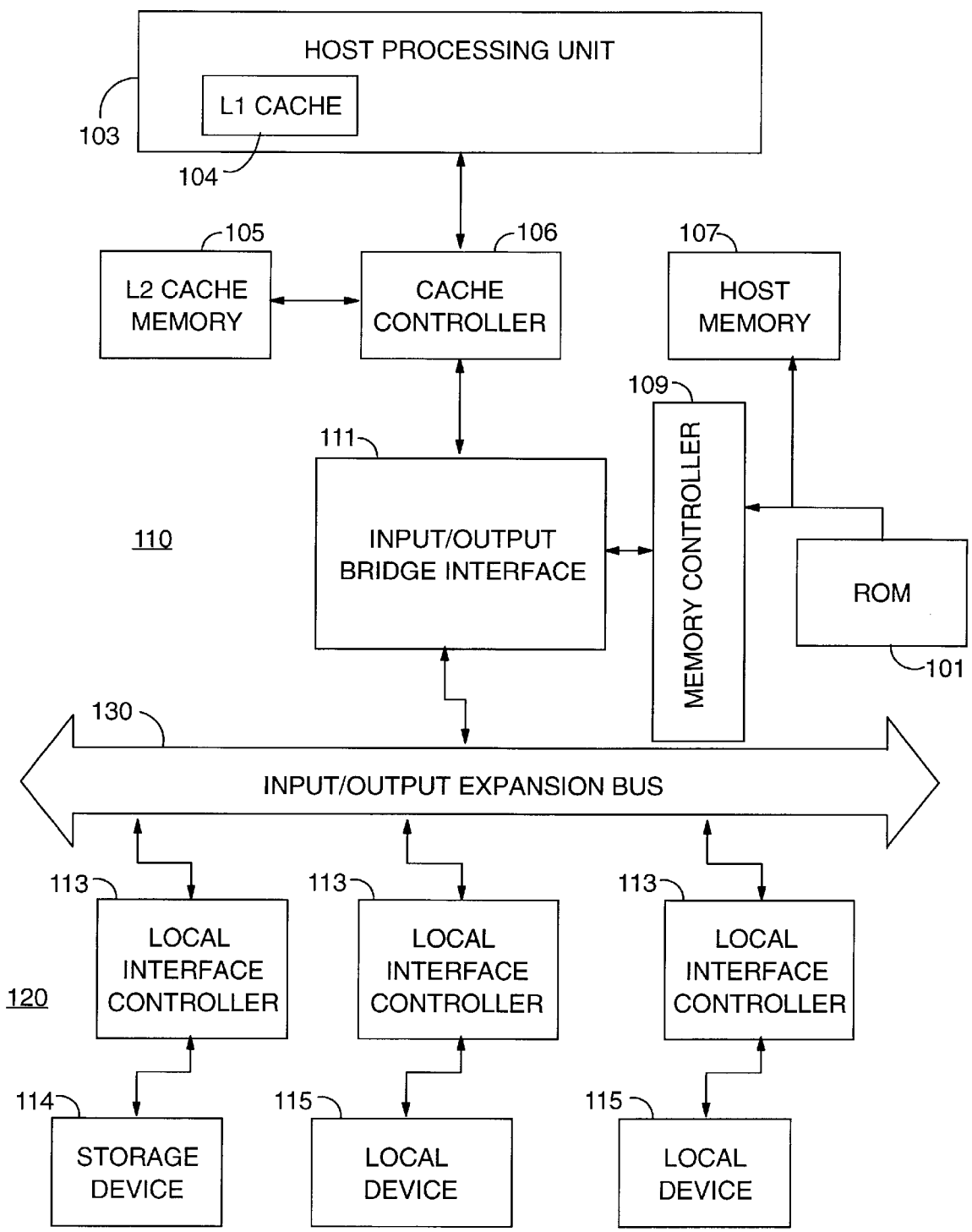
FIG. 1, is a block diagram of an exemplary computer system incorporating the present invention.

Referring to FIG. 1, a block diagram of an exemplary computer system 100 incorporating the present invention is shown. The computer system 100 may comprise a Personal Computer System, such as an IBM Personal Computer or systems compatible therewith. The computer system 100 may operate as an stand alone work station or it may be part of a larger computer network operating either as a client station or a server station.

The computer system 100 comprises two processing sides, a host processing side 110 which performs high level processing functions, such as those specified by operating system and applications, and a local processing side 120 which performs peripheral functions, such as providing storage media interface or communication interface for the computer system 100. The host processing side 110 and local processing side 120 are coupled to each other via an input/output (I/O) expansion bus 130. The I/O expansion bus 130 is compliant with one of many suitable I/O expansion bus protocols that allow a local interface controller to take control of the bus for performing a specified function, such as transferring blocks of data across the I/O expansion bus 130. Examples of such bus protocols include those defined by PCI or MicroChannel specifications which are hereby incorporated by reference.

The host processing side 110 may include a single host processing unit 103 or, in a multi processing system, a plurality of host processing units for controlling the overall function of the computer system 100. The host processing unit 103 may be one of many commercially available host processing units such as a Pentium Processor (R) offered by lntel(R) Corporation, or a PowerPC(R) processor offered by IBM(R) Corporation. As is well known, the host processing unit 103 initially operates by executing firmware instructions stored in a Read-Only-Memory (ROM) 101. The firmware instructions, also known as Basic I/O System or BIOS may include instructions for detecting attached devices and instructions for a power on self test (POST). Generally, upon completion of the firmware instructions, the host processing unit 103 executes operating system instructions by loading the OS from a local side storage device 114 into host memory 107. The transfer of data between the host processing unit 103, the ROM 101 and the host memory 107 is controlled by a memory controller 109. Whereas, transfer of data between the host processing side 110 and the I/O expansion bus 130 is controlled by an I/O bridge interface 111. In order to enhance processor performance the host processing unit 103 may include an internal cache (L1 cache) 104 and/or an external cache (L2 cache) 105 for storing most recently used data and instructions thus obviating the need for initiating long host memory cycles. The cache memory generally comprises a high speed static random access memory (SRAM) which is positioned in close proximity to the host processing unit 103. The data transfers in and out of the L2 cache are controlled by a well known cache controller 106. The I/O bridge interface 111 is designed to interface between the memory controller 109, the host processing unit 103 via the external cache controller 106, and the I/O expansion bus 130. The host processing unit 103 interfaces with the I/O expansion bus 130 and consequently with the local processing side 120 via a suitable I/O bridge interface 111.

As explained later in detail the storage device 114 interfaces with the I/O expansion bus 130 via a local interface controller 113. One of ordinary skill in the art may appreciate that the depicted host processing side 110 is merely exemplary and depending on application various system architectures, uniprocessing or multi-processing, may be designed to implement the functional requirement of the host processing side 110.

On the local processing side 120, the computer system 100 may include a plurality of local interface controllers 113, such as Small Computer System Interface (SCSI) controllers which are coupled to various local devices 115. As such, storage devices, communication devices, printing devices, networking devices, imaging devices, etc. may be added to complement system functionality and features. For example, the computer system 100 may be utilized as a server station having a Fast Wide SCSI local interface controller with a Redundant Array of Inexpensive Drives (RAID) as storage devices.

Figure 2:
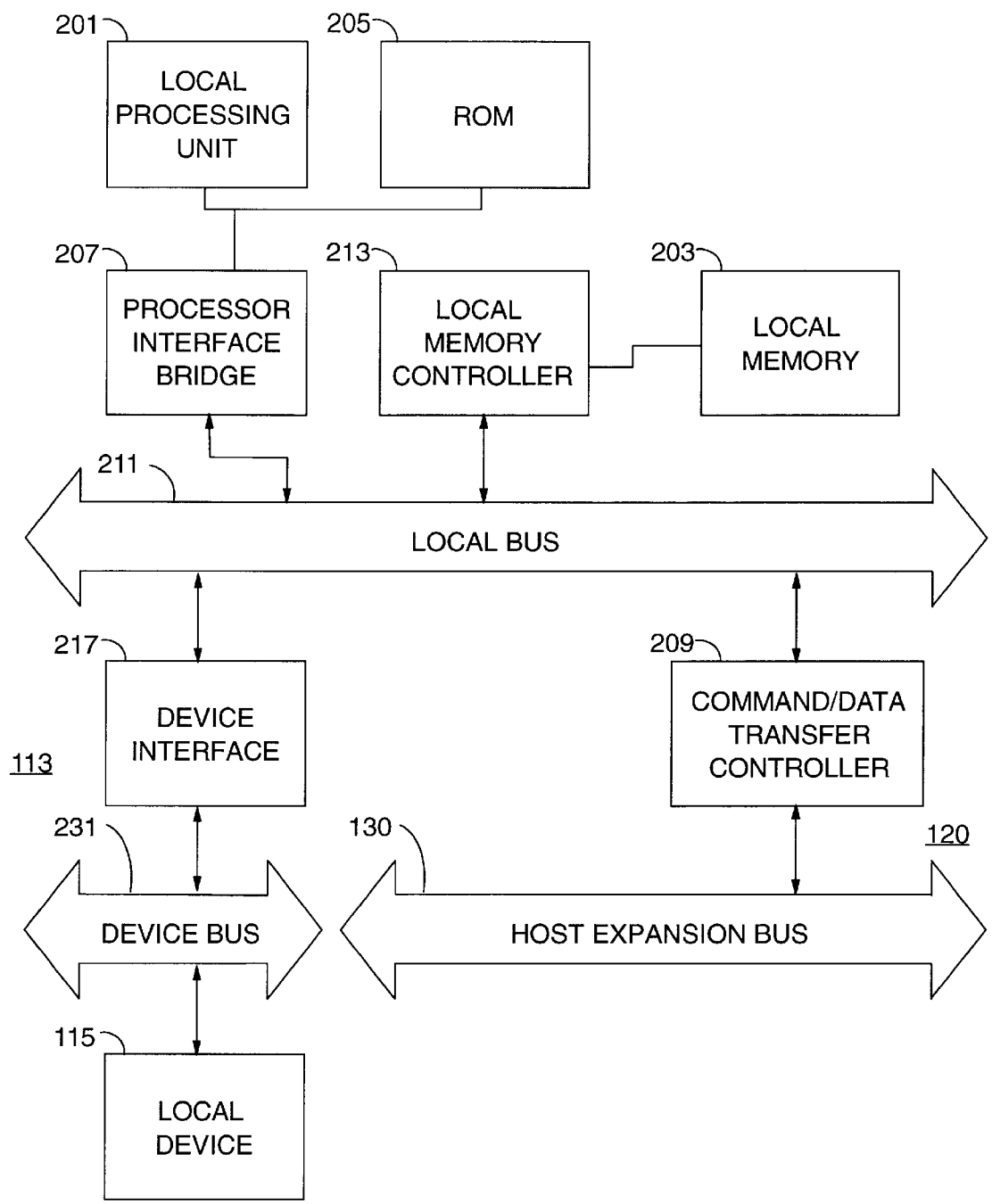
FIG. 2, is a block diagram of local interface controller of FIG. 1.

Referring to FIG. 2, a more detailed block diagram of the local interface controller 113 is shown to include a local processing unit 201 for controlling the overall peripheral functions of the local side including its ability to act as a bus master for controlling the I/O expansion bus 130. The local processing unit 201 may comprise a variety of commercially available processors, such as a PowerPC(R) 403 controller offered by IBM(R) Corporation. Similar to the host processing side 110, the local processing unit 201 executes firmware instructions stored in a local ROM 205. The local interface controller 113 includes a local bus 211 for interfacing the local processing unit 201 with various local side elements via a processor interface bridge 207. Preferably, the local bus 211 comprises a PCI bus which interfaces with the local processing unit 201 via a processor interface bridge 207. Also, coupled to the local bus 211, is a local memory controller 213 for controlling transfer of data in and out of the local memory 203. On the other side of the local bus 211, a well known device interface 217 is coupled between the local bus 211 and a device bus 231 (e.g. SCSI bus). The local interface controller 113 interfaces a local device 115, such as a SCSI storage device, through the device interface 217. In the preferred embodiment of the present invention, the local device 115 is one of a number of devices which comprises a RAID storage array capable of transferring large blocks of data with the local processing side 120. A command/data transfer controller 209 interfaces the local bus 211 to the I/O expansion bus 130 as well as controlling transfer of data blocks and command blocks between the host processing side 110 and the local processing side 120 in accordance with the present invention.

Figure 3:
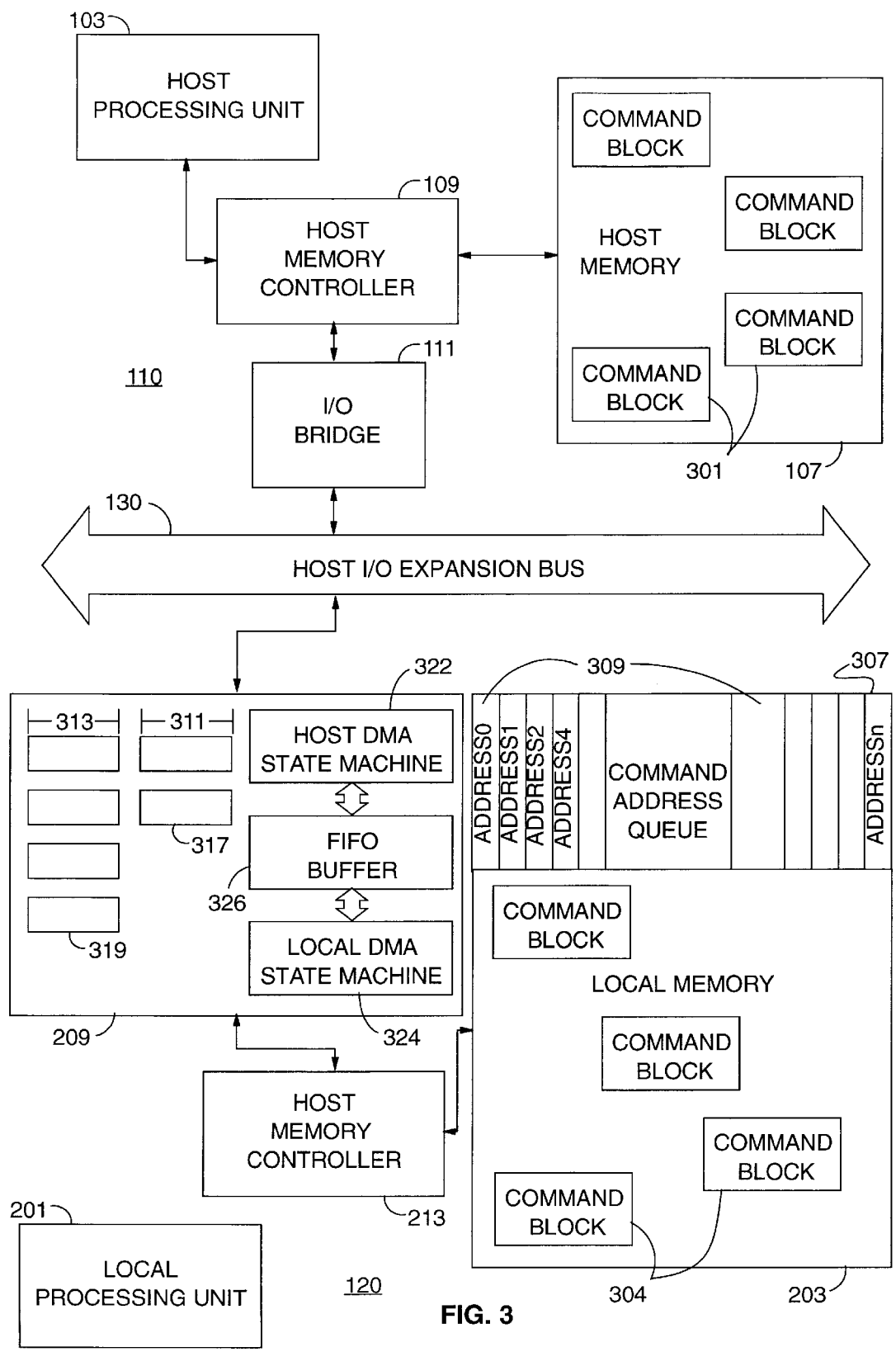
FIG. 3, is a more detailed block diagram of the computer system of FIG. 1.

Referring to FIG. 3, a more detailed block diagram of relevant portions of the host processing side 110 and the local processing side 120 which implement the preferred embodiment of the present invention is shown. On the local processing side 120, the command/data block transfer controller 209 includes a host DMA state machine 322 for transferring data blocks in and out of the host memory 107 over the I/O expansion bus 130. The command/data block transfer controller 209 also includes a local DMA state machine 324 for transferring data blocks in and out of the local memory 203 via the local memory controller 213. A first-in-first-out (FIFO) buffer 326 coupled between the host DMA state machine 322 and local DMA state machine 324 is disposed within the command/data block transfer controller 209 for temporarily storing data blocks involved in the data transfer. During a command block transfer from the host processing side 110 to the local processing side 120, the FIFO buffer 326 receives and temporarily stores the command block from the host DMA state machine 322 and provides such temporarily stored command block to the local DMA state machine 324 to be stored in a command block portion of the local memory.

The host processing unit 103, before the start of any command block transfer, creates one or more host command blocks 301. The command block address of each of the host command blocks 301 is transferred to a host command address register set 311 in the command/data block transfer controller 209. When writing into the host command address register set 311, the host processing unit 103 in addition to writing the host address information also writes a command transfer start signal into the host command address register set 311 which signals the command/data block transfer controller 209 to start a command transfer specified by the host address information. The local processing unit 201, prior to the start of any command block transfer, creates a command address queue portion 307 for storing a plurality of local command address images 309 each having address information corresponding to a local memory address where a subsequent local command block 304 is to be stored. As soon as the host processing unit 103 has written a host address into the host command address register set 311, the command/data block transfer controller 209, via the host DMA state machine 322, retrieves one of a corresponding host command block 301 without any local processing unit 201 intervention. The host DMA state machine 322 temporarily stores the retrieved host command block 301 in the FIFO buffer 326. Thereafter, the local DMA state machine 324, also without local processing unit 201 intervention, retrieves the command block stored in the FIFO buffer 326 and transfers it into a local memory location specified by a local command address image 309. As such, the local processing unit 201 does not have to be interrupted to perform the command block transfer and the host processing unit 103 does not have to wait for the local processing unit 201 to complete the command block transfer. Thus, both the host processing unit 103 and the local processing unit 201 are relieved of the overhead associated with transfer of command blocks.

The local command address images 309 store local address information relating to corresponding local command blocks 304. The command/data block transfer controller 209 processes the local address information for storing the command blocks transferred from the host processing side 110 into the local memory 203 via the local DMA state machine 324. The command/data block transfer controller 209 includes a local command address queue register set 313 having a plurality of local address queue registers 319 each corresponding to location within the command address queue portion 307 of local memory 203. The local processing unit 201 upon initialization sets appropriate pointer values pointing to addresses within the command address queue portion 307 indicating where a subsequent local command address image 309 is to be stored and where a subsequent local command address image 309 is to be retrieved from.

Figure 4:
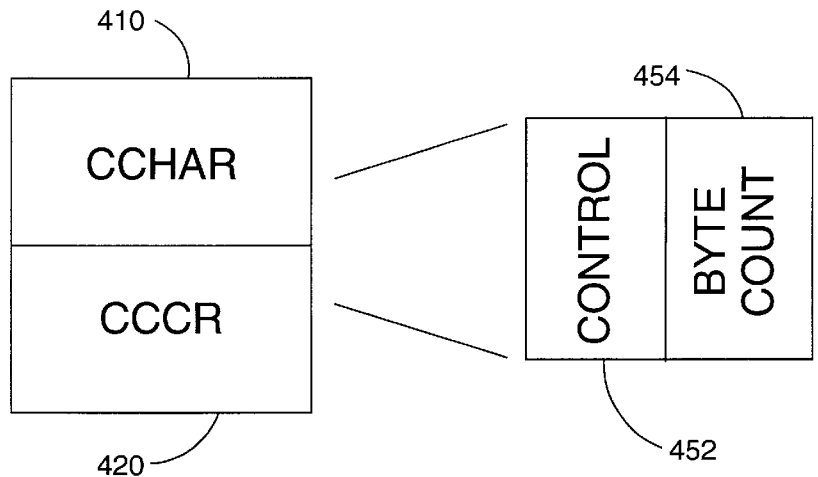
FIG. 4 is a diagram of command block address register set shown in the block diagram of FIG. 3.

Referring to FIG. 4, a diagram 400 defining the host command address register set 311 according to the preferred embodiment of the present invention is shown. The host command address register set 311 comprises two 32 bit registers: a Command Channel Host Address Register (CHAR) 410 and a Command Channel Control Register (CCCR) 420. The host processing unit 103 loads CHAR. 410 with a host memory address of a command block to be transferred to the local processing side 120. The CCCR 420 controls the command channel for the transfer. The CCCR 420 is divided into two portions: a command block count portion 454 and a control portion 452.

Figure 5:
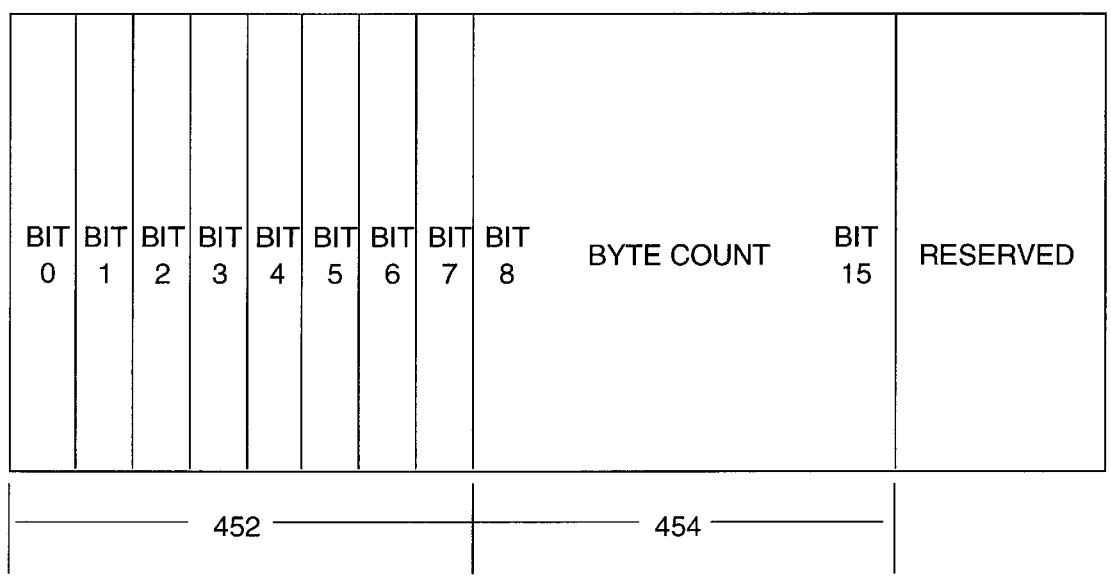
FIG. 5 is a diagram of a CCCR shown in FIG. 4.

Referring to FIG. 5, a diagram of the CCCR 420 is shown. The CCCR 420 has its bits 31-16 reserved. The bits 15-8 comprise the command block count portion 454 of the CCCR 420 and contain the byte count of the corresponding command block addressed by the CHAR. 410. The control portion 452 comprises eight bits as defined below:

Bit 7-5, reserved;

Bit 4, the interrupt-local-enable bit (ILE), when set to 1, will cause the command channel interrupt to be set upon completion of the current command block transfer; Bit 3, the semaphore bit acts as the command channel access control semaphore. When the host processing unit 103 reads this bit as a '0', it has control of the command channel and is able to program the host command address register set 311 to transfer a command block into the local memory 203. In order to lock the command channel, the semaphore bit after being read as '0' is automatically set to a '1' to prevent other host resources from gaining access to the command channel. The semaphore bit 3 is reset to '0' after the command channel operation is complete, thus freeing the channel for another transfer;

Bit 2 is reserved;

Bit 1, the command transfer start signal bit, when set to '1' by the host processing unit 103 signals the command/data block transfer controller 209 to start a command channel to copy a command block starting at address indicated by the CHAR. 410. The Command transfer start signal bit is reset to '0' upon completion of writing the copied command block into the command queue in the local memory 203. As explained later in detail, the command transfer start signal bit is also used to indicate whether multiple command blocks are chained to each other. As such, the command transfer start signal bit also constitutes a chaining enable information bit allowing for chaining of multiple commands when set '1'; and Bit 0 is reserved.

As mentioned above, the present invention further provides for queuing of multiple local command address images 309 which are sequenced to minimize local processing unit overhead. Thus, the local command address queue register set 313 of the command/data block transfer controller 209 comprises four 32-bit local address queue registers 319.

Figure 6:
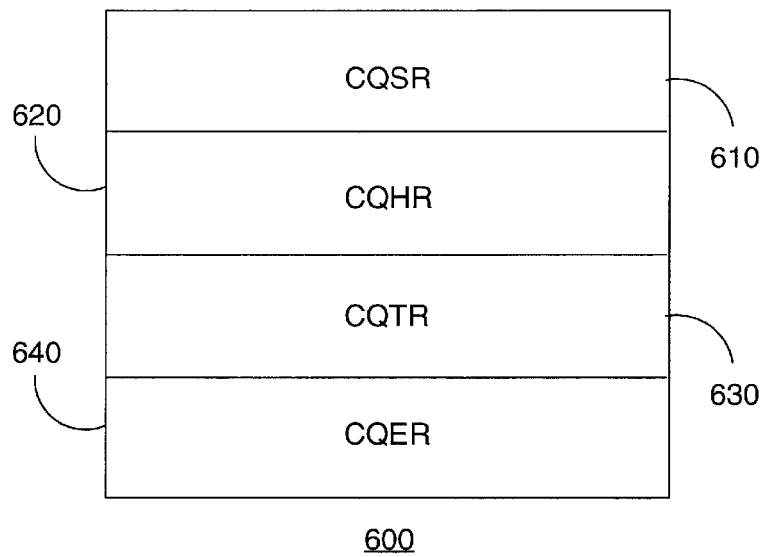
FIG. 6 is a diagram of a local command address queue register set shown in the block diagram of FIG. 3.

Referring to FIG. 6, a diagram 600 defining the local command address queue register set 313 is shown. A Command Queue Start Register (CQSR) 610 contains a local memory address of the start of the command address queue portion 307. A Command Queue Head Register (CQHR) 620 contains a local memory address where the command/data block transfer controller 209 will fetch the next local command address image 309. A Command Queue Tail Register (CQTR) 630 contains a local memory address where the local processing unit 201 will store the next local command address image 309. A Command Queue End Register (CQER) 640 contains a local memory address of the end of the command address queue portion 307.

Figure 7:
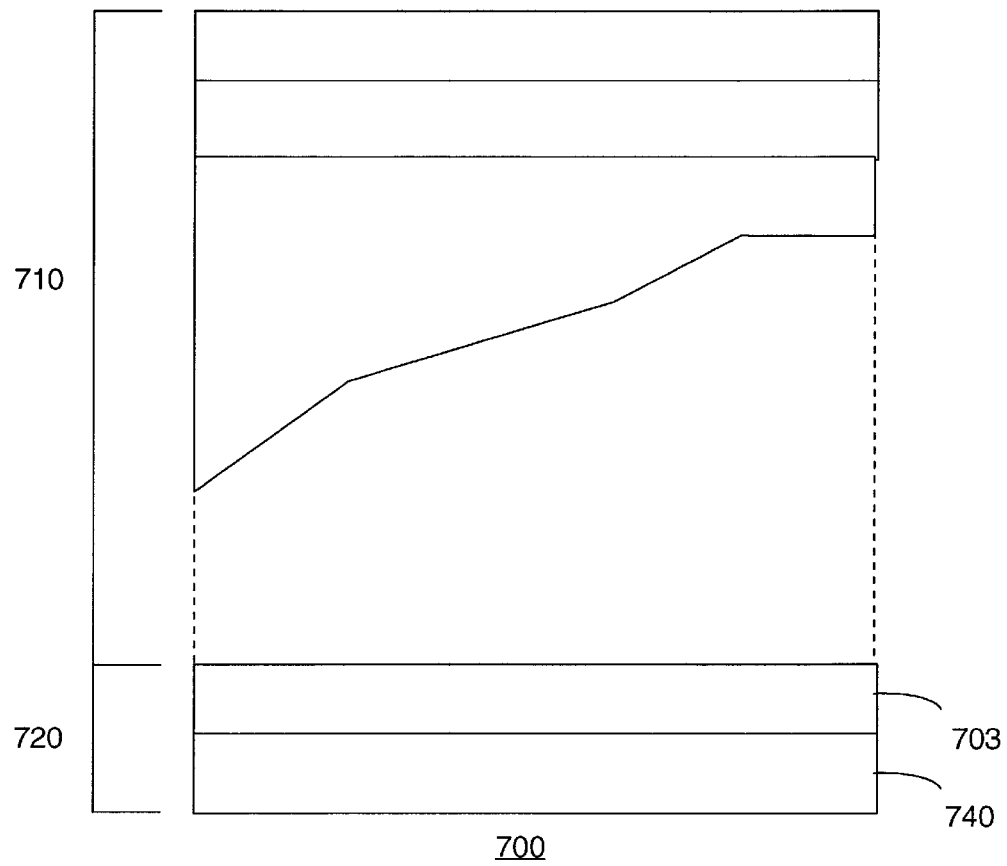
FIG. 7 is a diagram of a command block used in a command block transfer of the system shown in FIG. 1.

Referring to FIG. 7, a diagram 700 of a command block as created by the host processing unit 103 is shown. The command block includes a command portion 710 and an appended portion 720. The command portion 710, which may be variable in length, is constructed by the host processing unit 103 and is stored in one of the host command blocks 301. The appended portion 720 is used to allow multiple command blocks to be chained together. The appended portion 720 includes two images: a CHAR image 730 and CCCR image 740 corresponding respectively to the CHAR. 410 and the CCCR 420. The CHAR image 730 and the CCC image 740 contain the address and the control settings of a subsequently chained command block. In order to enable command chaining, the host processing unit 103 after building the command portion 710 builds the appended portion 720 by storing the address of the subsequent command block in the CHAR image 730 and by storing control settings in the CCCR image 740, thus enabling chaining operation. In the preferred embodiment of the present invention, chaining is enabled by storing a '1' state in the command transfer start signal bit of the CCCR image 740 which when loaded into the CCC 420 would automatically signal the command/data block transfer controller 209 to start the subsequent command block transfer.

Referring back to FIG. 3, the command address registers 317 of the host command address register set 311 respectively correspond to the two 32 bit registers, CHAR 410 and CCC 420 illustrated in FIG. 4. Similarly, the local address queue registers 319 of the local command address queue register set 313 correspond to the registers CQSR 610, CQHR 620, CQTR 630 and CQER 640 of FIG. 6.

In the preferred embodiment of the present invention, the host command address register set 311 and local command address queue register set 313 are incorporated within the command/data block transfer controller 209. As shown, the local memory 203 is partitioned to include the command address queue portion 307 for storing one or more local command address images 309. On the host processing side 110, the host memory 107 is partitioned to include a plurality of scattered host command blocks 301 for storing command block images created by the host processing unit 103. As described before, the host memory controller 109 controls transfers of the host command blocks 301 among host memory 107, the host processing unit 103 and the I/O bridge interface 111. Whereas, the command/data transfer controller 209 controls transfer of data and command blocks between the host processing side 110 and the local processing side 120.

Operationally, upon system start up, the local processing unit 201 loads predefined values into CQSR 610, CQHR 620, and CQTR 630 indicating the starting address of the command address queue portion 307 of the local memory 203. Initially, the CQSR 610, CQHR 620, and CQTR 630 are loaded with identical values indicating the starting local memory address of the command address queue portion 307. Values in CQHR 620 and CQTR 630 indicate where a subsequent local command address image 309 is stored and where a subsequent local command address image 309 is retrieved. The CQER 640 is loaded with a value indicating the ending address of the designated command address queue portion 307.

Upon start of a command block transfer, the host processing unit 103 first examines the semaphore bit 3 of the control register portion 452 to determine whether a command block transfer is in process. If semaphore bit 3 is read as a '1', the host processing unit 103 would not commence a command block transfer as such state indicates that a command block transfer is already in progress. However, if semaphore bit 3 is read as a '0' state, the host processing unit 103 would commence a command block transfer by writing host command block address information to the host command address register set 311. The host command block address information comprises the host command block starting address in host memory 107 and the byte count of the command block which are written into command address registers 317 according to CHAR 410 and CCCR 420. Upon start of the very first command block and concurrent with writing the host command block address information into the command address registers 317, the host processing unit 103 sets the command transfer start signal bit to a '1' thus enabling the start of the command block transfer. The command/data block transfer controller 209 is responsive to the command transfer start signal bit and the values stored in the host command address register set 311, to retrieve a specified command block via the host DMA state machine 322. As such the command block transfer is initiated without local processing unit 201 intervention. The host DMA state machine 322 stores the retrieved command block in the FIFO buffer 326 on a first-in-first-out basis. Once the transferred command block is stored in the FIFO buffer 326, the local DMA state machine 324 proceeds to copy the command block stored in the FIFO buffer 326 into local memory starting at the local command address as specified by the pointer values stored in the local command address queue register set 313.

As specified above, the pointer values stored in the local command address queue register set 313, are initially set by the local processing unit 201 to a predefined setting. The local processing unit 201 creates the local command address images 309 based upon free buffer space available in the local memory 203 and the maximum number of command blocks that the local processing unit 201 can process at any given time. The ability of the local processing unit 201 to create a queue of local command address images 309 allows the local command blocks 304 to be scattered in the local memory 203 rather than requiring allocation of a contiguous block of local memory 203.

Once the initial command block is transferred, the contents of the appended portion 720 of the command block are written into the host command address register set 311. If chaining operation is enabled by a command transfer start signal bit setting of '1', the command/data block transfer controller 209 would automatically start the subsequent command transfer based on the host command block address information stored in the appended portion 720 without local processing unit 201 intervention.

Once the local processing unit 201 assembles a local command address image 309, the CQHR is incremented and becomes unequal to CQTR. Once the command block is stored in the FIFO buffer 326, the local DMA state machine 324 will copy the command block into the local memory 203 starting at the address specified in CQTR. Once a command block is copied into the local memory, the command/data block transfer controller 209 increments the CQTR by the length of the local command address image 309.

The command/data block transfer controller 209 performs the above specified steps for each local command address image 309 queued in the command address queue portion 307 of the local memory, thus relieving the local processing unit 201 and the host processing unit 103 of overhead associated with command block transfers.

Upon completion of transfer of each command block into the local memory starting at a local command address image 309, the command/data block transfer controller 209 increments the tail pointer in the CQTR and compares it to the head pointer value stored in the CQHR. The command address queue portion 307 dequeuing operation is continuously performed for as long as the tail pointer value is not equal to the head pointer. However, when tail pointer value becomes equal to head pointer value, the command/data block transfer controller 209 terminates the transfer of command blocks into local memory at the local command address images 309, since such condition indicates that the maximum number of command blocks are being processed by the local processing unit 201. Since the present invention contemplates queuing a finite number of local command address images 309 greater than the length of the command address queue (as indicated by the end pointer value stored in the CQER), a wrap around feature is provided to accommodate situations when the number of enqueued local command address images 309 cause CQHR head pointer value to exceed CQER end pointer value. In such a case, the head pointer is wrapped to have a value equal to the start pointer in the CQSR, and upon enqueuing of additional local command address images 309 is incremented. However, in this situation, the local processing unit 201 would enqueue additional local command address images 309 only as long as the wrapped CQHR head pointer would not become equal to CQTR tail pointer. Once the wrapped CQHR head pointer is equal to CQTR tail pointer minus the size of a local command address image 309, the local processing unit 201 terminates enqueuing additional local command address images 309 until the image addressed by CQTR tail pointer is dequeued.

The local command address queuing specified by the command address queue portion 307 and the local command address images 309 according to the present invention allows the local processing unit 201 to queue local common block addresses without having to wait for completion of one or more commands already in progress. That is, if one of many commands being processed completes out of order in which it was queued, the local processing unit 201 can reallocate the corresponding command block space freed by such command without having to wait for the sequential completion of each command block.

Accordingly, present invention transfers command blocks without local processing unit 201 intervention by setting a command transfer start signal bit which signals the command/data block transfer controller 209 to start a command block transfer. Both the local processing unit 201 and the host processing unit 103 are thus relieved of handshaking overhead associated with command block transfers.

What is claimed is:

1. An information handling system for transferring command blocks from a host processing side to a local processing side over an I/O expansion bus, comprising:

a host processing unit for processing command and data information on the host processing side;

a host memory accessible by the host processing unit including one or more memory portions for storing one or more command blocks created by the host processing unit to be transferred to the local processing side;

a local processing unit for processing command blocks transferred from the host processing side;

a local memory accessible by the local processing unit including one or more local memory portions for storing the command blocks transferred from the host processing side and a command address queue portion having a plurality of local command address images wherein each of the command address images stores a local command address information corresponding to a local memory portion; and a command block transfer controller for controlling command block transfers including a command address register set accessible by the host processing unit and a command address queue register set programmable by the local processing unit before starting of any command block transfer for setting a predefined local memory address for the command address queue portion, the command address register set including address register for storing a host command address information corresponding to a host memory portion storing a command block to be transferred to the local processing side and a register for storing a command transfer start signal; wherein the host processing unit writes the host command address information and concurrent therewith writes the command transfer start signal information into the signal register; and wherein the command block transfer controller is responsive to the command start signal to retrieve the command block from the host memory without local processing unit intervention; and wherein the command block transfer controller is responsive to said predefined local memory address for storing the command block in the local memory portion corresponding to the predefined local address.

2. The information handling system of claim 1, wherein a transferred command block includes a command portion and a command address portion appended thereto.

3. The information handling system of claim 2, wherein the command address portion includes a chain enable information indicating whether another command block is chained to the transferred command block.

4. The information handling system of claim 2, wherein the command address portion includes a host address of the command block chained to the transferred command block.

5. The information handling system of claim 4, wherein the command block transfer controller includes a detector to determined whether another command block is chained to the transferred command block by examining the chain enable information; and wherein the command block transfer controller transfers the host memory address of the chained command block to the command address register set, and wherein the command block transfer controller is responsive to the host memory address so transferred for retrieving from a host memory portion a corresponding command block.

6. The information handling system of claim 1, wherein the local processing unit further storing, in said command address queue register set, a head pointer value pointing to a default command address image indicating where a subsequent local memory address information is to be stored and a tail pointer pointing to a default status queue image indicating from where a subsequent local command address information is to be retrieved.

7. The information handling system of claim 1, wherein the host processing unit writes a host command address information in the command address register set before start of any command block transfer.

8. The information handling system of claim 1, wherein the command address register set contains a command channel busy information indicating whether a command block transfer has completed.

9. The information handling of claim 8, wherein the host processing unit examines the channel busy information before starting a command block transfer.

10. The information handling system of claim 5, wherein the command block transfer controller further including a FIFO buffer coupled between a host memory access controller and a local memory access controller for receiving and temporarily storing data involved in a command block transfer.

11. The information handling system of claim 1, wherein the host command address information includes an address corresponding to a host memory portion and a size information indicating the length of a command block stored in the host memory portion.

12. The information handling system of claim 1, wherein the host processing side comprises a host system, and wherein the local processing side comprises a local interface controller.

* * * * *